United States Patent [19]
Heymanns et al.

[11] Patent Number: 5,738,127
[45] Date of Patent: Apr. 14, 1998

[54] PROCESS FOR REMOVING CONTAMINATING COATINGS FROM METAL SURFACES

[75] Inventors: Peter Heymanns, Essen; Waldemar Kascha; Ernst Prott, both of Oberhausen; Horst Scholz, Wesel, all of Germany

[73] Assignee: Hoechst Aktiengesellschaft, Germany

[21] Appl. No.: 631,894

[22] Filed: Apr. 16, 1996

[30] Foreign Application Priority Data

Apr. 25, 1995 [DE] Germany ............... 195 15 086.4

[51] Int. Cl.$^6$ ............... B08B 7/00; C03C 23/00; C23D 17/00
[52] U.S. Cl. ............... 134/2; 134/29; 134/38; 134/39; 134/40; 134/42
[58] Field of Search ............... 134/2, 6, 29, 38, 134/39, 40, 42

[56] References Cited

U.S. PATENT DOCUMENTS

| | | | |
|---|---|---|---|
| 1,812,321 | 6/1931 | Davidson | 134/38 |
| 2,710,843 | 7/1955 | Stebleton . | |
| 3,058,918 | 10/1962 | Gatza | 134/38 |
| 4,094,701 | 6/1978 | Fekete | 134/2 |
| 4,537,705 | 8/1985 | Mahoney et al. | 134/38 X |
| 4,780,237 | 10/1988 | Schmid et al. | 252/174.22 |
| 5,308,401 | 5/1994 | Geke et al. | 134/2 |

FOREIGN PATENT DOCUMENTS

| | | |
|---|---|---|
| 423635 | 4/1991 | European Pat. Off. . |
| 518634 | 12/1992 | European Pat. Off. . |
| 1546126 | 3/1970 | Germany . |
| 1621581 | 7/1970 | Germany . |
| 3005322 | 8/1980 | Germany . |
| 4131877 | 4/1993 | Germany . |
| 6-80998 | 3/1994 | Japan . |
| 7-118689 | 5/1995 | Japan . |
| 8-73890 | 3/1996 | Japan . |
| 876681 | 9/1961 | United Kingdom . |

*Primary Examiner*—Arlen Soderquist
*Attorney, Agent, or Firm*—Bierman, Muserlian and Lucas

[57] ABSTRACT

A process for removing contaminating coatings from metal surfaces in which the metal surface to be cleaned is brought into contact with an aqueous alkaline solution containing as an additive 0.1 to 10% by weight, based on the aqueous alkaline solution, of at least one compound of the formula $$R^1-O-(CH_2-CHR^3-O-)_x R^2 \qquad \text{I}$$

in which $R^1$ and $R^2$ are individually alkyl of 1 to 15 carbon atoms, $R^3$ is hydrogen or methyl and x is an integer from 1 to 25.

10 Claims, No Drawings

PROCESS FOR REMOVING CONTAMINATING COATINGS FROM METAL SURFACES

STATE OF THE ART

In times of increased environmental awareness, the recycling of used materials is accorded a growing importance. Thus, in the metal-processing industry, for example, in the production of metallic tin, it is not only the smelting of tin ores which plays an essential role but also the recovery of metal from wastes of tin-plated plate iron, so-called tinplate, or tin-plated ferrous alloys.

However, these materials which are employed in the form of a wide variety of utility goods are contaminated following use as a packaging or container material, for example, with numerous contaminants ranging from strongly adhering paint or synthetic resin coatings of various composition to oil and fat residues. If such contaminating coatings are removed either not at all or only to an inadequate extent, they hinder the oxidative detachment of the tin from the metallic surface at the electrolytic detinning stage. The poor detinning which results from this leads automatically to the iron scrap being of relatively low quality.

Since this iron scrap is usually sent for smelting to enable re-use of the iron as well, it is essential to remove the contaminating coatings completely, since experience has shown that halogen-containing additives in the coatings lead, during the melt processes of smelting to the formation of dioxins.

From DE 1 546 126 and DE 1 621 581, it is known that in the removal of paint coatings from tinplate, use is made of aqueous solutions which comprises, in addition to sodium hydroxide and/or sodium carbonate, monoalkylated polyalkylene glycol ethers of the formula R'—O—[CH$_2$—CHR"—O—]$_y$H, in which R' is alkyl, aryl, alkaryl or aralkyl and R" is methyl or ethyl or hydrogen, and y is any number from 1 to 25.

The coated tinplate is treated with the above-mentioned solutions at temperatures of between 50° and 100° C. Stripping in this context takes place as part of either a two-stage or a one-stage detinning process. In the two-stage process, the coated tinplate wastes are first treated with the solution used for stripping. Then, in the second stage, alkaline detinning takes place in the presence of oxidizing agents, and the stannate solutions are subjected to electrolysis to recover the tin. The stripping time required amounts to several hours. In the one-stage process, stripping and detinning are carried out simultaneously. In this process too, the long stripping time of 2 hours or more is a disadvantage.

OBJECTS OF THE INVENTION

It is an object of the invention to provide a process by which a wide variety of contaminating coatings can be removed rapidly and completely from metal surfaces.

This and other objects and advantages of the invention will become obvious from the following detailed description.

The Invention

The novel process of the invention for removing contaminating coatings from metal surfaces comprises bringing metal surface to be cleaned into contact with an aqueous alkaline, additive-containing solution, wherein the aqueous alkaline solution contains as additive 0.1 to 10% by weight of at least one compound of the formula

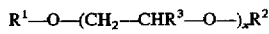

in which R$^1$ and R$^2$ are individually alkyl of 1 to 15 carbon atoms, R$^3$ is hydrogen or methyl and x is an integer from 1 to 25.

The process of the invention can be applied to metal surfaces, especially those of tinplate wastes, having a very wide variety of coatings. Examples of possible coatings are coating materials based on polyurethanes, polyesters, polyvinyl chloride, epoxy resins, phenolic resins, alkyd resins, modified alkyd resins or mixed resins (with or without pigment). If the tinplate has previously been used as a packaging or container material, then the density of the coating may well be in the mm range.

The aqueous alkaline solution used for stripping comprises a strong base, examples of which are alkali metal or alkaline earth metal hydroxides, alkali metal or alkaline earth metal carbonates or strongly basic nitrogen compounds such as higher amines. Preference is given to the use of alkali metal hydroxides and alkali metal carbonates, especially sodium hydroxide and sodium carbonate. The pH of the alkaline solution is greater than 11, preferably about 12.

The polyalkylene glycol ethers added to the aqueous alkaline stripping solution as additive are compounds of the formula

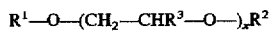

in which R$^1$ and R$^2$ are individually alkyl of 1 to 15 carbon atoms, R$^3$ is hydrogen or methyl and x is an integer from 1 to 25. Examples of R$^1$ and R$^2$ are methyl, ethyl, propyl, isopropyl, n-butyl, isobutyl, pentyl, isopentyl, octyl, 2-ethylhexyl, decyl and dodecyl to pentadecyl.

The polyalkylene glycol ethers used in the stripping solutions are preferably those in which R$^1$ and R$^2$ are individually alkyl of 1 to 8 carbon atoms, R$^3$ is hydrogen or methyl and x is an integer from 3 to 15. Preferably, the compounds of formula I are polyethylene glycol dimethyl ethers and polypropylene glycol dimethyl ethers in which x is an integer from 3 to 15. Higher polyalkylene glycol ethers, i.e. those in which x is an integer from 3 to 15, not only possess a high stripping capacity but also have the environmentally highly desirable adavantage of a low volatility.

The solution provided for removing the contaminating coatings usually comprises 1.5–12.5% by weight, preferably 5–12% by weight, and more preferably 10–11.5% by weight, of the base, and 0.1–10% by weight, preferably 0.5–7% by weight and more preferably 1–5% by weight, based in each case on the aqueous alkaline solution, of at least one compound of formula I R$^1$—O—(CH$_2$—CHR$^3$—O—)$_x$R$^2$, in which R$^1$, R$^2$ R$^3$ and x can have any of the above-mentioned definitions.

In a further embodiment, the metal surface to be cleaned is brought into contact with an aqueous alkaline solution which comprises 0.1–10% by weight, based on the aqueous alkaline solution, of a mixture comprising a) 70 to 99.9% by weight, based on the mixture, of at least one compound of the formula

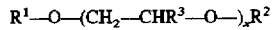

in which R$^1$ and R$^2$ are individually alkyl of 1 to 15 carbon atoms, R$^3$ is hydrogen or methyl and x is an integer from 1 to 25, and b) 0.1 to 30% by weight, based on the mixture, of at least one compound of the formula $$R^1\text{—O—}(CH_2\text{—}CHR^3\text{—O—})_x H \qquad \text{II}$$

in which $R^1$ is alkyl of 1 to 15 carbon atoms and $R^3$ is hydrogen or methyl and x is an integer from 1 to 25.

For stripping, an aqueous alkaline solution is used which comprises 0.1 to 10% by weight, preferably 0.5 to 7% by weight and more preferably 1–5% by weight, based on the aqueous alkaline solution, of a mixture comprising a) 70 to 99.9% by weight, preferably 80 to 99.9% by weight and more preferably 90 to 99.9% by weight, based on the mixture, of at least one compound of the formula $$R^1\text{—O—}(CH_2\text{—}CHR^3\text{—O—})_x R^2 \qquad \text{I}$$

in which $R^1$ and $R^2$ are individually alkyl of 1 to 15 carbon atoms, preferably alkyl of 1 to 8 carbon atoms, $R^3$ is hydrogen or methyl and x is an integer from 1 to 25, preferably from 3 to 15, and b) 0.1 to 30% by weight, preferably 0.1 to 20% by weight, more preferably 0.1 to 10% by weight, of at least one compound of the formula $$R^1\text{—O—}(CH_2\text{—}CHR^3\text{—O—})_x H \qquad \text{II}$$

in which $R^1$ is alkyl of 1 to 15 carbon atoms, preferably of 1 to 8 carbon atoms, $R^3$ is hydrogen or methyl and x is an integer from 1 to 25, preferably from 3 to 15.

A particularly high stripping activity is shown by the polyalkylene glycol ethers of formula I or of formulae I and II which are added to the aqueous alkaline solution as additives if they comprise not more than 50% by weight of polyalkylene glycol ethers where x<3, $R^1$, $R^2$ and $R^3$ having any of the above-mentioned definitions.

The polyalkylene glycol ethers of formulae I and II which can be used in accordance with the invention can be prepared in a known manner by addition of ethylene oxide or propylene oxide followed by terminal etherification of the hydroxyl groups.

To remove the coatings from the metal surfaces, the latter are brought into contact with the aqueous alkaline stripping solution. In this context, it has proven expedient to allow the aqueous alkaline stripping solution to act on the contaminated metal surface at elevated temperatures, since by this means, it is possible to considerably reduce the time required for this action.

Customarily, the metal surfaces are immersed into the stripping solution which is expediently stirred at the same time. In a further embodiment, the metal surfaces are sprayed with the aqueous alkaline stripping solution. The process of the invention is customarily carried out at a temperature of 50°–90° C., preferably 60°–90° C. and more preferably 70°–80° C. The time required for detachment of the coatings amounts to a few minutes.

When the aqueous, additive-containing alkaline stripping solution is heated, then depending on its composition, the reversible formation of an organic phase may occur. In the context of the removal of coatings, this phase separation has an advantageous effect since when the tinplate is immersed into the stripping solution, the supernatant organic phase comprising the stripping additive provides complete wetting even of parts of the tinplate which are difficult to get at.

When the process of the invention is implemented, the coatings are influenced physically and chemically so that, after allowing for an appropriate time of action, the coating materials swell up and become detached from the tinplate. Therefore, this enables the actual detinning media subsequently to act, unhindered and completely, on the tin covering of the iron plates.

By varying the amount of polyalkylene glycol ethers added, the detachment properties of the coating residues can be influenced within wide limits ranging from flaky to finely particulate detachment.

The process of the invention for the stripping of tinplated metal surfaces is usually followed by an electrolytic detinning stage in a manner known per se. However, stripping and detinning can also be carried out simultaneously in one step.

The novel stripping process is therefore distinguished by rapid, simple and complete removal of the coatings from the metal surfaces. By this means, it is possible to achieve a greater throughput in the stripping process than in the prior art, which also leads to a higher level of efficiency of all of the materials used for stripping. When the tin-plated metallic materials which have been stripped in this way are used in the detinning process, excellent yields of electrolytically recovered tin are obtained coupled with high quality of the iron scrap.

In the following examples, there are described several preferred embodiments to illustrate the invention. However, it should be understood that the invention is not intended to be limited to the specific embodiments.

EXAMPLES 1a AND b 2.5% by weight (1a) or 5% by weight (1b) of a polyethylene glycol dimethyl ether mixture were added to a 10% strength aqueous sodium hydroxide solution, the percentages of the mixture being based on the sodium hydroxide solution. The polyethylene glycol dimethyl ether mixture used comprised 0.5–5% by weight of triethylene glycol dimethyl ether, more than 65% by weight of tetraethylene glycol dimethyl ether, less than 25% by weight of pentaethylene glycol dimethyl ether and less than 5% by weight of higher polyethers, the sum of the percentages by weight always being 100.

The temperature of the solution was then raised to 80° C. with phase separation being observed from 45° C. Thus, a tinplate material on which there were adhering residues of coating material based on polyurethanes or polyesters was freed from these coating-material residues by immersion in the solution for a defined period of action. During this period, the solution was stirred so that the surface of the tinplate was wetted completely.

After the periods of action indicated in Table 1, the state of the tinplate surface was assessed visually. In Example 1a, the coatings had become detached, predominantly in plateletlike form, after only 3 minutes, from the surface of the tinplate which was already slightly etched. After 6 minutes, the surface was completely free from adhering coatings. In Example 1b, the coatings had become detached almost completely after 3 minutes from the tinplate surface, which was already slightly etched, and were present in the form of a fine suspension.

EXAMPLE 2

5% by weight of a polyethylene glycol dimethyl ether mixture consisting of 45% by weight of triethylene glycol dimethyl ether, 35% by weight of tetraethylene glycol dimethyl ether and 20% by weight of pentaethylene glycol dimethyl ether was added to a 10% strength aqueous sodium hydroxide solution, the percentage of the mixture being based on the sodium hydroxide solution. The temperature of the solution was then raised to 80° C. and the tinplate wastes from Example 1 were then immersed in the solution. After a treatment of 3 minutes' duration, a marked detachment of the coatings was observed which proceeded almost to completion in a treatment period of 10 minutes and led to virtually residue-free removal of coatings from the metal surfaces.

EXAMPLE 3

The tinplate wastes from Example 1 were treated as described in Example 1, but using 5% by weight of pure triethylene glycol dimethyl ether, based on the sodium hydroxide solution. After a period of action of 3 minutes, partial detachment of the coatings from the tinplate was observed. After 10 minutes, almost complete detachment of the coatings had taken place.

EXAMPLE 4

The tinplate wastes from Example 1 were treated as described in Example 1, but adding 5% by weight of a mixture of homologous polyethylene glycol dimethyl ethers, based on the sodium hydroxide solution. The polyethylene glycol dimethyl ether mixture was comprised of 0.1% by weight of dimethylene glycol dimethyl ether, 0.1% by weight of diethylene glycol monomethyl ether, 36.4% by weight of triethylene glycol dimethyl ether, 13.9% by weight of triethylene glycol monomethyl ether, 31.4% by weight of tetraethylene glycol dimethyl ether, 3.3% by weight of tetraethylene glycol monomethyl ether, 11.2% by weight of pentaethylene glycol dimethyl ether, 3.5% by weight of hexaethylene glycol dimethyl ether and 0.1% by weight of higher polyethers.

The results are compiled in Table 1.

Comparison Experiment 1

The tinplate wastes from Example 1 were treated as described in Example 1 but using 5% by weight of the following mixture which comprised 92.5% by weight, based on the mixture, of homologous polyethylene glycol monobutyl ethers and 4.4% by weight, based on the mixture, of homologous polyethylene glycol dibutyl ethers: 3.5% by weight of 2-butoxyethanol, 6.4% by weight of diethylene glycol monobutyl ether, 9.6% by weight of triethylene glycol monobutyl ether, 12.2% by weight of tetraethylene glycol monobutyl ether, 13.7% by weight of pentaethylene glycol monobutyl ether, 13.9% by weight of hexaethylene glycol monobutyl ether, 13.5% by weight of heptaethylene glycol monobutyl ether, 10.9% by weight of octaethylene glycol monobutyl ether, 6.0% by weight of monoethylene glycol monobutyl ether, 2.2% by weight of decaethylene glycol monobutyl ether, 0.6% by weight of undecaethylene glycol monobutyl ether, 4.4% by weight of di- to undecaethylene glycol dibutyl ether and 3.1% by weight of n-butanol.

The degree of stripping of the tinplate wastes which was achieved with this mixture after a period of action of 10 minutes (see Table 1) was markedly poorer than in the case of Examples 1–4.

TABLE 1

| Example | Addition of additive in % by weight, based on the aqueous alkaline solution | Detachment properties* after |  |  |
|---|---|---|---|---|
| | | 3 min | 6 min | 10 min |
| 1a | 2.5 | 6 | 8 | 8 |
| 1b | 5 | 6 | 8 | 8 |
| 2 | 5 | 1 | 7 | 7 |
| 3 | 5 | 1 | 4 | 6 |
| 4 | 5 | 1 | 7 | 7 |
| CE 1 | 5 | 1 | 2 | 3 |

*Evaluation of the tinplate surface:
Removal (appearance) of the surface coating (in %)
1: Swelling
2: <50%
3: >50%
4: >50% (surface slightly etched)
5: >90%
6: >90% (surface slightly etched)
7: 100%
8: 100% (surface slightly etched)

Various modifications of the compositions and method of the invention may be made without departing from the spirit or scope thereof and it is to be understood that the invention is intended to be limited only as defined in the appended claims.

What we claim is:

1. A process for removing contaminating coatings from metal surfaces comprising contacting at a temperature of at least 50° C. the metal surfaces to be cleaned with an aqueous alkaline, additive-containing solution, wherein the aqueous alkaline solution contains as additive 1 to 10% by weight, based on the aqueous alkaline solution, an additive mixture consisting essentially of a) 70–99.9% by weight, based on the mixture, of at least one compound of the formula

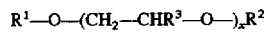

$$R^1-O-(CH_2-CHR^3-O-)_xR^2 \qquad I$$

in which $R^1$ and $R^2$ are individually alkyl of 1 to 15 carbon atoms, $R^3$ is hydrogen or methyl and x is an integer from 1 to 25, and b) 0.1 to 30% by weight, based on the mixture, of at least one compound of the formula

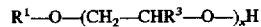

$$R^1-O-(CH_2-CHR^3-O-)_xH \qquad II$$

in which $R^1$ is alkyl of 1 to 15 carbon atoms and $R^3$ is hydrogen or methyl and x is an integer from 1 to 25 wherein a phase separation into an upper organic phase and a lower aqueous phase occurs.

2. The process of claim 1 wherein the aqueous alkaline solution comprises 1–5% by weight, based on the aqueous alkaline solution, of the additive mixture.

3. The process of claim 1 wherein $R^1$ and $R^2$ are individually alkyl of 1 to 8 carbon atoms, $R^3$ is hydrogen or methyl and x is an integer from 3 to 15.

4. The process of claim 1 wherein the compounds of formula I are polyethylene glycol dimethyl ethers or polypropylene glycol dimethyl ethers in which x is an integer from 3 to 15.

5. The process of claim 1 wherein the aqueous alkaline solution contains 1 to 5% by weight, based on the aqueous alkaline solution, of a mixture consisting essentially of 90–99.9% by weight, based on the mixture, of at least one compound of formula I and 0.1 to 10% by weight, based on the mixture, of at least one compound of formula II.

6. The process of claim 5 wherein in formula I $R^1$ and $R^2$ are individually alkyl of 1 to 15 carbon atoms, $R^3$ is hydrogen or methyl, x is an integer from 3 to 15 and, in formula II, $R^1$ is alkyl of 1 to 8 carbon atoms, $R^3$ is hydrogen or methyl and x is an integer from 3 to 15.

7. The process of claim 1 wherein the compounds of formula I are polyethylene glycol dimethyl ethers or polypropylene glycol dimethyl ethers and, the compounds of formula II, are polyethylene glycol monomethyl ethers or polyproylene glycol monomethyl ethers in which x is an integer from 3 to 15.

8. The process of claim 1 wherein the action of the aqueous alkaline, additive-containing solution takes place at a temperature of between 50° and 90° C.

9. The process of claim 1 wherein to remove the contaminating coating the metal surfaces are immersed in the aqueous alkaline, additive-containing solution.

10. The process of claim 1 wherein the metal surface to be cleaned is coated with coating materials based on polyurethanes or polyesters.

* * * * *